US006962367B2

(12) United States Patent
Müller

(10) Patent No.: US 6,962,367 B2
(45) Date of Patent: Nov. 8, 2005

(54) SAFETY DEVICE AND METHOD FOR A VEHICLE WITH A STEERING SYSTEM

(75) Inventor: Olaf Müller, Rüsselsheim (DE)

(73) Assignee: Thyssenkrupp Presta AG, Eschen (LI)

( * ) Notice: Subject to any disclaimer, the term of this patent is extended or adjusted under 35 U.S.C. 154(b) by 0 days.

(21) Appl. No.: 10/942,402

(22) Filed: Sep. 15, 2004

(65) Prior Publication Data

US 2005/0029792 A1 Feb. 10, 2005

Related U.S. Application Data

(63) Continuation of application No. 10/030,775, filed as application No. PCT/DE01/00737 on Feb. 28, 2001, now abandoned.

(30) Foreign Application Priority Data

Feb. 29, 2000 (DE) .......................... 200 03 708 U

(51) Int. Cl.[7] ....................... B60R 21/045; B60R 21/05
(52) U.S. Cl. ...................... 280/750; 280/753; 188/377; 296/187.05
(58) Field of Search ............................... 280/750, 751, 280/752, 753; 188/377; 296/187.05; 180/274, 180/282

(56) References Cited

U.S. PATENT DOCUMENTS

| | | | | |
|---|---|---|---|---|
| 4,198,075 A * | 4/1980 | Kob et al. | .................. | 280/753 |
| 4,948,168 A * | 8/1990 | Adomeit et al. | ............ | 280/732 |
| 5,344,184 A * | 9/1994 | Keeler et al. | ............... | 280/753 |
| 5,409,260 A * | 4/1995 | Reuber et al. | .............. | 280/753 |
| 6,283,508 B1 * | 9/2001 | Nouwynck et al. | ......... | 280/753 |

FOREIGN PATENT DOCUMENTS

DE 4243791 A1 * 6/1994 ......... B60R 21/045

OTHER PUBLICATIONS

Research Disclosure No. 409005 A, May 10, 1998.*

* cited by examiner

*Primary Examiner*—Peter C. English
(74) *Attorney, Agent, or Firm*—Martin Fleit; Paul D. Bianco; Fleit Kain Gibbons Gutman Bongini & Bianco P.L.

(57) ABSTRACT

A method and apparatus for a vehicle wherein a load absorption for an impact of the knees relative to the steering column is provided arranged in case of an accident to be adjusted toward the driver's knees.

17 Claims, 2 Drawing Sheets

"A"
4
4a
"B"
46
6
6a
1
9
15
40
5
2
20
30
29
A
3
32
50
8
26
34
28
11
7
22
24
B
6b
52
54
100

SAFETY DEVICE AND METHOD FOR A VEHICLE WITH A STEERING SYSTEM

RELATED APPLICATION

This application is a continuation of application Ser. No. 10/030,775 filed Jun. 3, 2002, abandoned, a National Stage filing of International Application No. PCT/DE01/00737, filed Feb. 28, 2001, the contents of which are here incorporated by reference in their entirety. The benefit of 35 USC 120 is asserted.

BACKGROUND OF THE INVENTION

1. Field of the Invention

The invention generally relates to a safety device and method of protecting a driver in means for a vehicle with a steering system, specifically a steering wheel and column.

2. Prior Art

In practice, in the diving in region of a driver's thighs in the lower dash board in motor vehicles, load absorbing elements are provided located which deform over a distance in the case of an accident or crash and thereby reduce load peaks by absorbing energy. For the same purpose in this field, air bags have also become known from the practice.

So far, adequate protection for the driver has been not been achieved in the event of an accident.

SUMMARY OF THE INVENTION

Therefore, the invention has as an object to create such a safety means for a vehicle with a steering system that will to protect therewith the leg region and especially a driver's thigh region in an accident to a large extent.

This object is achieved by a safety device, as well as a safety method, for protecting a driver in an accident situation.

Thus, according to the invention, a safety device means for a vehicle with a steering system is provided with regard to which a load absorbing means for an impact of the knee of a driver in the case of an accident is arranged. Therein, it is further provided that said load absorbing means for an impact of the knee includes a load absorbing sheet which is adjustable towards the driver's knees into and/or in the direction towards an effecting position in the case of an accident.

Therewith, it is achieved in a simple and especially effective manner that the driver's knee is intercepted and thereby his legs are protected.

With preference, it is further provided therewith that the load absorbing sheet is supported in its effecting or effective position via at least one load absorbing element with regard to the steering. Thereby, on the one hand, maximum legroom for the driver in the normal operation of the vehicle, i. e., without an accident situation, is achieved, and on the other hand, an optimum absorbing distance for the impact of the knee is provided in the case of an accident.

According to a preferred embodiment of the invention, a load absorbing element is formed by an air bag. It is true that the use of an air bag alone in this region is already known, as already stated above, however, only the use of the air bag leads to the adjustment of the load absorbing sheet and as load absorbing element in combination with the load absorbing sheet to a good solution for the protection of the driver's legs. The air bag alone is suitable to intercept and absorb the movement of the driver's leg, however, only the "point of impact" or "diving in point" of the driver's knee at the air bag is used. The combination of the air bag with the load absorbing sheet, apart from the simple adjustment of the latter, enables a better usage of the absorbing properties of the air bag independently of the "point of impact" of the driver's knee and, furthermore, the use of a smaller air bag what additionally has the consequence that the air bag is inflated and provided more quickly.

On the whole, it is preferred in the scope of the invention if the load absorbing sheet with the air bag is adjusted in the case of an accident in position towards the driver's knees in such a way that more crash absorbency distance is generated.

A further preferred and advantageous embodiment of the invention provides that the air bag includes a load restriction. The load restriction preferably includes a load limiting valve through which the gas is released from the inflating or inflated air bag in dependence of a load.

Another preferred variant of the invention provides that the load absorbing sheet can be swiveled towards the driver's knees into or in the direction towards an effective position in the case of an accident by swivel lever means. The swivel lever means preferably include two or four or more swivel levers. Alternatively or additionally, it can be provided that the swivel lever means are operated by means of a pyrotechnically activatable and/or drivable adjustment cylinder.

In combination with the above variant of the invention or verified in a different way, it is further preferred that if at least one load absorbing element together with the load absorbing sheet with regard to the steering column can be swiveled in position to the driver's knees into or towards an effective position in the case of an accident in such a way that more crash absorbency distance is generated. A plurality of load absorbing elements is preferably provided and/or each load absorbing element includes a load restriction which can be formed especially for each load absorbing element by a reverse lock which is designed so that a load absorbing resistance is generated in case of a load caused by the knees due to an accident.

The load absorbing means for an impact of the driver's knees are preferably arranged at the steering column and the load absorbing sheet in its position adjusted towards the driver's knees, given the case, is supported via the at least one load absorbing element at the steering column.

The safety method according to the invention, for a vehicle with a steering system, with reference to which load absorbing means for an impact of the driver's knees is adjusted towards the driver's knees in the case of an accident, is designed in such a way that in the case of an accident a load absorbing sheet is moved towards the driver's knees.

The adjusted or set load absorbing sheet is preferably supported by at least one load absorbing element with reference to the steering column.

In another variant of the method the load absorbing sheet is adjusted by means of an inflating air bag or swivel lever means whereby the load absorbing sheet is preferably adjusted by means of a pyrotechnically activatable and/or drivable adjustment cylinder.

As far as a load absorbing sheet is concretely named in the present document, therewith this component is not restricted to a metal material. This sheet-like load absorbency can easily be made of other materials as long as the durability for the given application is ensured what an ordinary person skilled in the art can easily detect or determine.

Two preferred alternatives of the invention are explained in the following.

Alternative 1: Load absorbing elements connected with the load absorbing sheet or load distributor sheet are located in the lower dash board body in a space-saving manner in the normal operation of the vehicle, i.e. that means not in an accident situation. The load absorbing sheet is mounted on swivel levers and is moved into a position close to the driver's knees only at the beginning of an accident, which accident is detected with corresponding known sensors, together with the load absorbing elements by means of a pyrotechnically driven cylinder. In a further development thereof there, i.e. if the load absorbing sheet is in a position close to the driver's knees, locking load absorbing elements correspondingly predetermine a long load reduction distance which also applies to the space below the steering column.

Alternative 2: The load absorbency is increased and evenly distributed by or onto an air bag on which the load absorbing sheet or load distribution sheet is arranged and adjusted in the case of an accident. The load peak is predetermined by the pressure in the air bag. Thereto, there is a pressure regulating valve which, e.g., has more gas released in the case of a higher load on the thighs.

BRIEF DESCRIPTION OF THE DRAWINGS

In the following the invention will be explained in more detail based on exemplary embodiment examples with reference to the drawings, in which.

DETAILED DESCRIPTION OF PREFERRED EMBODIMENTS OF THE INVENTION

Figure 1:
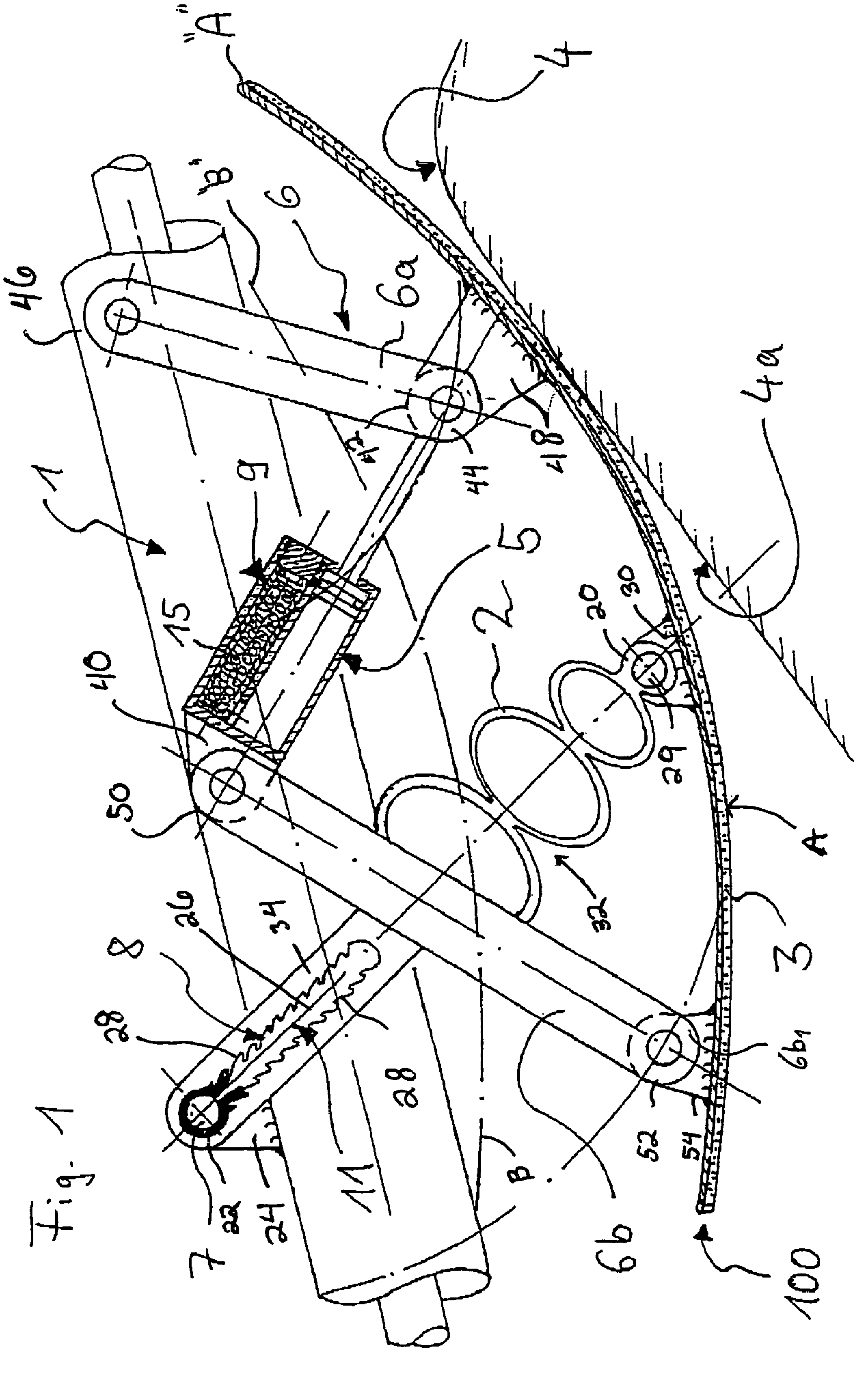
FIG. 1 shows a first embodiment example of the safety means according to the above alternative 1.

Equal reference symbols in the individual figures and illustrations of the drawings refer to equal or similar or equally or similarly working components. Based on the illustrations in the drawing also such features become evident which do not have reference numerals independent of whether the fact if such features are subsequently described or not. On the other hand, also features which are included in the present description, but not visible or illustrated in the drawing are easily evident to the ordinary person skilled in the art.

In FIG. 1 a first embodiment example of safety means 100 is shown to illustrate its components in a side view. Load absorbing elements 2 are pivotally mounted at one end 22 to a steering column 1 which is part of the fixed structure and possibly also to a not illustrated dash board on the outside and right of the knee 4 in such a way that they are accommodated in a space-saving manner in a normal condition, i.e., if no accident is happening. At the other end 20, the load absorbing elements 2 are connected at an angle as shown in FIG. 1, with the end 20 pivotally mounted to a pin 29 carried by block 30 fixed to a load absorbing sheet 3 which covers a form part of the lower half of the dash board (not shown) and the steering column 1 which is part of the vehicle structure, and simultaneously absorbs and distributes the hitting load of the knee 4 in the case of an accident. The load absorber 32 consists of a series of interconnected permanently deformable loops (load absorber elements 2) and a link 34 containing a slot 26 with teeth 28, as shown in FIG. 1.

In the case of an accident the load absorbing sheet 3 is swiveled out by a pyrotechnic adjustment cylinder 5, by means of upper and lower swivel levers 6*a* and 6*b* of a swivel lever means 6. The load absorbing elements 2, elongated as shown in FIG. 1, also swivel out at end 22 mounted on a bearing 7 carried by pillar 24 fixed to column 1, and lock in their bearing 7 with a reverse lock 8, in the form of a slot 26 with teeth 28, on each side, as shown FIG. 1, which simultaneously forms a load restriction 11. End 22 is slidably and pivotally mounted on bearing 7, as shown in FIG. 1. In the pyrotechnic adjustment cylinder 5 a cartridge 9 with a driving charge 15 is shown. The swivel lever 6*b* is longer than the swivel lever 6*a* so that the load absorbing sheet 3 in the region of the driver's shin 4*a* is swiveled further to him than in the region of the knee 4. Thereby the load absorbing sheet 3 is moved to an optimum position to intercept the driver's front movement, e.g., in a collision, what leads together with the bent shape of the load absorbing sheet 3 to an optimum absorbency and deceleration of the driver's kinetic energy in an accident.

Cylinder 5 is pivotally attached at one end 40 to steering column 1 and its other end 42 is pivotally attached in common with end 44 of lever 6*a*, the other end 46 of which is pivotally attached to column 1 as shown in FIG. 1. Ends 42 and 44 are pivotally mounted on pillar 48 fixed to sheet 3.

Lever 6*b* is pivotally mounted in common at one end 50 with end 40 cylinder 5, and pivotally mounted at end 52 to sheet 3 via pillar 54 fixed to sheet 3, as shown in FIG. 1. Upper lever 6*a* is shorter than the lower lever 6*b*, as shown in FIG. 1.

Now, in an accident the knees 4 can be decelerated via the load absorbing sheet 3 and by means of the load absorbing elements 2 deforming upon load over an essentially longer distance and therewith to a lower peak load level. Thereby the space under the steering column 1 is used to absorb energy as energy absorbing deformation way in an advantageous manner.

Figure 2:
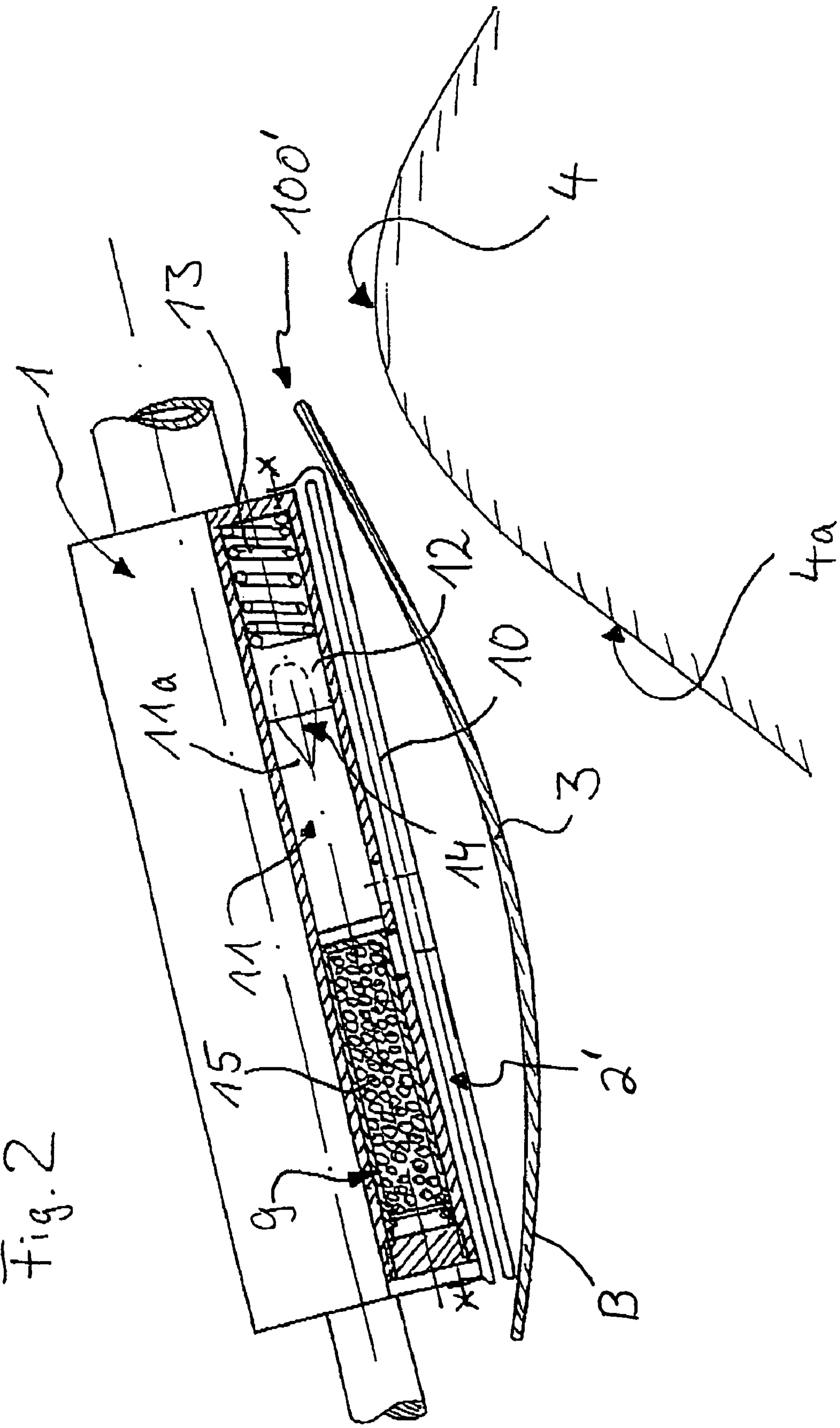
FIG. 2 shows a second embodiment example of the safety means according to the above alternative 2.

In FIG. 2 the above mentioned alternative 2' of the safety means 100' with its components is illustrated. In this variant of which an embodiment example is shown in FIG. 2 in a side view, an air bag 10 which moves the load absorbing sheet 3 in the direction to knee 4 in a crash and can absorb kinetic energy of the knee 4, is mounted between a steering column 1 and possibly an opposing plate mounted thereon (not shown) as moving element analogues to the adjustment cylinder 5 of the first alternative, and at the same time as load absorbing element 2'. Furthermore, a load limiting valve 11*a* exists herein which is in connection with the internal of the air bag 10. Depending on the applied load by the knees 4 a piston 12 moves against a spring 13 and opens therewith a gas release 14. Furthermore, this load limiting valve 11*a* is therewith a load limitation 11 controlled by the impact speed and/or load of the knees 4. Furthermore, for the air bag 10 a cartridge 9 with a driving charge 15 is provided.

The load absorbing sheet 3 preferably has the shape shown in the figures of the drawing so that on the one hand a hitting knee 4 is intercepted or blocked and, given the case, the load absorbency can come into effect and the knee 4 is protected by the resulting reduction in energy.

The load absorbing sheet 3 is shown in FIG. 1 in an effective or effecting position A, and the resting position B of the load absorbing sheet 3 is drawn in dot-and-dash lines. In the FIG. 2 the load absorbing sheet 3 is in the resting position B. By positioning and shaping the air bag 10, the effective or working position of the load absorbing sheet 3 can be determined in the embodiment of FIG. 2.

The invention is illustrated based on the embodiment examples in the specification and in the drawings only by example and not restricted thereto but comprises all variations, modifications, substitutions and combinations which an ordinary person skilled in the art can derive from the present document, in particular in the scope of the claims and the general description in the introduction of this specification as well as the description of the embodiment examples and the illustration thereof in the drawing, and can combine with his expert knowledge as well as the prior art. In particular, all individual features and embodiment possibilities of the invention and the embodiment examples thereof can be combined.

| Reference symbols | |
|---|---|
| 1 | steering column |
| 2 | load absorbing elements |
| 3 | sheet |
| 4 | knee |
| 4a | shin |
| 5 | pyrotechnic adjustment cylinder |
| 6 | swivel lever means |
| 6a, 6b | swivel levers |
| 7 | bearing |
| 8 | reverse lock |
| 9 | cartridge |
| 10 | air bag |
| 11 | load limitation |
| 11a | load limiting valve |
| 12 | piston |
| 13 | spring |
| 14 | gas release |
| 15 | driving charge |
| 100 | safety means |

What is claimed is:

1. In a vehicle safety device for protecting a passenger's legs in the event of a vehicle collision including an impact sheet, swivel levers each having a first end and a second end, pivotally connected at their second ends to the impact sheet at spaced locations, and at their first ends to fixed vehicle structure so that the swivel levers control the movement of the impact sheet from a retracted position away from the legs of the passenger to a protracted position toward the legs of the passenger in the event of a collision to protect the passenger, and a device responsive to a collision to activate the swivel levers into the protracted position, the improvement comprising a bearing fixed to the vehicle structure, an elongated load absorber having a first end and a second end, with the first end pivotally attached at an angle to the impact sheet and the second end containing a slot slidably and pivotally mounted relative to the bearing fixed to the vehicle structure, the slot in said load absorber having a configuration to function as a reverse lock, and the load absorber containing a permanently deformable section that will deform permanently to provide an optimum absorbency and deceleration of the passenger's kinetic energy in the event of a vehicle collision.

2. In a vehicle safety device according to claim 1, wherein the device responsive to a collision includes a pyrotechnic adjustment cylinder.

3. In a vehicle safety device according to claim 2, wherein the pyrotechnic adjustment cylinder includes a cartridge and a driving charge.

4. In a vehicle safety device for protecting a passenger's legs in the event of a vehicle collision including an impact sheet, swivel levers each having a first end and a second end, pivotally connected at their second ends to the impact sheet at spaced locations, and at their first ends to fixed vehicle structure so that the swivel levers control the movement of the impact sheet from a retracted position away from the legs of the passenger to a protracted position toward the legs of the passenger in the event of a collision to protect the passenger, and a device responsive to a collision to activate the swivel levers into the protracted position, the improvement comprising, a load absorber having a first end and a second end, with the first end pivotally attached at an angle to the impact sheet and the second end pivotally mounted relative to the vehicle structure, the load absorber containing a permanently deformable section that will deform permanently to provide an optimum absorbency and deceleration of the passenger's kinetic energy in the event of a vehicle collision.

5. In a vehicle safety device according to claim 4, wherein the device responsive to a collision includes a first end pivotally connected to the impact sheet and a second end pivotally connected to a steering column of the vehicle.

6. In a vehicle safety device according to claim 4, wherein the impact sheet intercepts the legs of the passenger in the protracted position.

7. In a vehicle safety device according to claim 6, wherein the impact sheet deforms upon interception of the legs of the passenger, absorbing of the passenger's kinetic energy and decelerating the passenger during a vehicle collision.

8. In a vehicle safety device according to claim 4 wherein the second end of the load absorber is attached to a steering column of the vehicle, and the passenger is the operator of the vehicle.

9. In a vehicle safety device for protecting a passenger's legs in the event of a vehicle collision including an impact sheet, swivel levers each having a first end and a second end, pivotally connected at their second ends to the impact sheet at spaced locations, and at their first ends to fixed vehicle structure so that the swivel levers control the movement of the impact sheet from a retracted position away from the legs of the passenger to a protracted position toward the legs of the passenger in the event of a collision to protect the passenger, and a driver responsive to a collision to drive the swivel levers into the protracted position, the improvement comprising, a load absorber having a first end and a second end, with the first end pivotally attached at an angle to the impact sheet and the second end mounted relative to the vehicle structure, and wherein in the event of a vehicle collision, the load absorber is drawn by the impact sheet to the protracted position, the load absorber containing a permanently deformable section that will deform permanently upon load over a predetermined distance thereby absorbing energy of collision to a lower peak load level to provide an optimum absorbency and deceleration of the passenger's kinetic energy during a vehicle collision, and a lock that becomes effective to prevent the load absorber from reversing when the load absorber is drawn by the impact sheet into the protracted position.

10. In a vehicle safety device according to claim 9 wherein the second end of the load absorber is attached to a steering column of the vehicle, and the passenger is the operator of the vehicle.

11. In a vehicle safety device according to claim 9 wherein the driver is a pyrotechnical device.

12. In a vehicle safety device according to claim 11 wherein the pyrotechnical device is mounted in common with the second end of one of the swivel levers.

13. In a vehicle safety device according to claim 9 wherein the swivel levers are spaced apart defining an upper swivel lever and a lower swivel lever, with the upper swivel lever being shorter than the lower swivel lever.

14. In a vehicle safety device according to claim 9 wherein the load absorber is elongated with a longitudinal extending slot defined in the second end, and a mounting element fixed to the vehicle structure is positioned to ride in the longitudinal extending slot.

15. In a vehicle safety device according to claim 14 wherein the mounting element serves as a bearing for the load absorber to enable it to be drawn to the protracted position and to pivot.

16. In a vehicle safety device according to claim 14 wherein a portion of the longitudinal extending slot defined in the second end of the load absorber defines the lock that becomes effective to prevent the load absorber from reversing when the load absorber is drawn by the impact sheet into the protracted position.

17. In a vehicle safety device according to claim 14 wherein the longitudinal extending slot defined in the second end of the load absorber is configured to act as a load restriction.

* * * * *